Patented Dec. 6, 1927.

1,652,024

UNITED STATES PATENT OFFICE.

LEONARD ANGELO LEVY, OF CRICKLEWOOD, ENGLAND, ASSIGNOR TO APEX (BRITISH) ARTIFICIAL SILK LTD., OF STRATFORD, ENGLAND.

PROCESS FOR THE MANUFACTURE OF CELLULOSE ACETATE.

No Drawing. Application filed October 2, 1926, Serial No. 139,238, and in Great Britain October 8, 1925.

My invention relates to a process for the manufacture of cellulose acetate by the treatment of cellulose or its near conversion products with an acetylating mixture consisting of acetic anhydride and acetic acid.

According to the invention, I subject cellulose, preferably air dried to contain 6% to 7% residual moisture, to an acetylating process by treatment with acetic anhydride and acetic acid, and a metallic catalyst namely chromium. The chromium may be in any convenient form, such as the acetate, sulphate, nitrate, butyrate, benzene-sulphonate, naphthalene-sulphonate, chloracetate, carbonate, hydrated oxide or the like.

The advantage of this process consists in the fact that by avoiding the use of sulphric acid or a similar powerful condensing agent, the risk of the formation of degradation products of cellulose is reduced to a minimum.

The following example will serve to illustrate my invention, though it is in no wise restricted to this example:—

*Example.*—5 ozs. chromium acetate are dissolved in 30 lbs. acetic acid contained in a suitable vessel fitted with reflux condenser and agitator; 10 lbs. acetic anhydride are then added and finally 3 lbs. of cellulose, preferably in the form of air dried tissue paper prepared from pure cotton; the mixture is then heated to boiling point until the cellulose has passed into solution, the mass being preferably slowly agitated during the whole period. After this the product may be precipitated forthwith in the usual manner, when it will be found to be soluble in chloroform; or it may be subjected to any of the well known processes for modifying its solubility.

The solutions of this new product are glutinous and find application in the arts where this property is of value. It should be clearly understood that we may vary the proportions within wide limits provided that the amount of acetic acid is such that the product is easily manipulated throughout the entire process and the amount of anhydride represents a reasonable excess above and beyond that required to form the triacetate. Further, the form in which the chromium is introduced may also be varied to any desired extent, although we prefer to use it in the form of acetate as this salt is free from the objection introduced by the effect of the acid radical. Moreover, the quantity of the chromium salt added may be materially varied provided always that the amount used be sufficient to effect the desired acetylation within a reasonable period of time. Further, the temperature may be varied also within such limits as admit of the operation being effected within a reasonable period of time.

I claim:

1. A process for the manufacture of cellulose acetate consisting in treating cellulose with a mixture of acetic acid and acetic anhydride in the presence of a chromium compound, substantially as hereinbefore described.

2. A process for the manufacture of cellulose acetate, consisting in treating cellulose with a mixture of acetic acid, and acetic anhydride in the presence of a chromium salt, substantially as hereinbefore described.

3. A process for the manufacture of cellulose acetate, consisting in treating cellulose with a mixture of acetic acid, and acetic anhydride in the presence of chromium acetate, substantially as hereinbefore described.

4. A process for the manufacture of cellulose acetate, consisting in treating cellulose with a mixture of acetic acid, and acetic anhydride in the presence of chromium acetate, in the following proportions: 3 pounds of cellulose, 30 pounds acetic acid, 10 pounds acetic anhydride, and 5 ounces of chromium acetate, substantially as hereinbefore described.

5. As an article of manufacture, cellulose acetate obtained by treating cellulose with a mixture of acetic acid and acetic anhydride in the presence of a chromium compound, substantially as hereinbefore described.

LEONARD ANGELO LEVY.